(12) United States Patent
Spahl et al.

(10) Patent No.: US 9,090,281 B2
(45) Date of Patent: Jul. 28, 2015

(54) LATERALLY TILTABLE, MULTITRACK VEHICLE

(71) Applicant: FORD GLOBAL TECHNOLOGIES, LLC, Dearborn, MI (US)

(72) Inventors: Robert Spahl, Cologne (DE); Edmund Halfmann, Neuss (DE); Torsten Gerhardt, London (GB); Marc Simon, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/201,550

(22) Filed: Mar. 7, 2014

(65) Prior Publication Data

US 2014/0252730 A1    Sep. 11, 2014

(30) Foreign Application Priority Data

Mar. 7, 2013  (DE) .......................... 10 2013 203 923

(51) Int. Cl.
| | |
|---|---|
| *B62D 9/04* | (2006.01) |
| *B60G 3/12* | (2006.01) |
| *B62D 9/02* | (2006.01) |
| *B62K 5/10* | (2013.01) |

(52) U.S. Cl.
CPC .. *B62D 9/02* (2013.01); *B60G 3/12* (2013.01); *B62D 9/04* (2013.01); *B62K 5/10* (2013.01); *B60G 2300/45* (2013.01)

(58) Field of Classification Search
CPC ............... B62D 9/02; B62D 9/04; B62K 5/10
See application file for complete search history.

(56) References Cited

U.S. PATENT DOCUMENTS

| | | | |
|---|---|---|---|
| 2,353,503 | A | 7/1944 | Rost et al. |
| 2,474,471 | A | 6/1949 | Dolan |
| 3,417,985 | A | 12/1968 | Hannan |
| 3,558,123 | A | 1/1971 | Yew |

(Continued)

FOREIGN PATENT DOCUMENTS

| | | |
|---|---|---|
| DE | 679 966 C | 8/1939 |
| DE | 1 937 578 U | 1/1963 |

(Continued)

OTHER PUBLICATIONS

German Search Report for Application No. 10 2013 203 923.9 dated Oct. 8, 2013.

(Continued)

*Primary Examiner* — Drew Brown
(74) *Attorney, Agent, or Firm* — Jones Robb, PLLC; Raymond L. Coppiellie

(57) ABSTRACT

A laterally tiltable, multitrack vehicle is disclosed. The vehicle includes a vehicle body and at least three wheels, with two of the wheels being assigned to a common axle to form a first wheel pair. A first wheel control part suspends the first wheel of the wheel pair from the vehicle body and a second wheel control part suspends the second wheel of the wheel pair from the vehicle body. The first wheel control part is configured to be coupled to the second wheel control part via a first gearwheel mechanism, and the second wheel control part is configured to be coupled to the first wheel control part via a second gearwheel mechanism. The first and second gearwheel mechanisms each have a negative transmission ratio between a drive shaft and an output shaft. The laterally tiltable, multitrack vehicle may be a motor vehicle.

21 Claims, 4 Drawing Sheets

(56) References Cited

U.S. PATENT DOCUMENTS

| | | |
|---|---|---|
| 3,572,456 A | 3/1971 | Healy |
| 5,040,812 A | 8/1991 | Patin |
| 5,040,823 A | 8/1991 | Lund |
| 5,069,476 A | 12/1991 | Tsutsumi et al. |
| 5,116,069 A | 5/1992 | Miller |
| 5,161,425 A | 11/1992 | Baskett et al. |
| 5,161,822 A | 11/1992 | Lund |
| 5,207,451 A | 5/1993 | Furuse et al. |
| 5,324,056 A | 6/1994 | Orton |
| 5,337,847 A | 8/1994 | Woods et al. |
| 5,347,457 A | 9/1994 | Tanaka et al. |
| 5,580,089 A | 12/1996 | Kolka |
| 5,611,555 A | 3/1997 | Vidal |
| 5,762,351 A | 6/1998 | SooHoo |
| 5,765,115 A | 6/1998 | Ivan |
| 5,765,846 A | 6/1998 | Braun |
| 5,772,224 A | 6/1998 | Tong |
| 5,791,425 A | 8/1998 | Kamen et al. |
| 5,825,284 A | 10/1998 | Dunwoody et al. |
| 5,839,082 A | 11/1998 | Iwasaki |
| 5,927,424 A | 7/1999 | Van Den Brink et al. |
| 6,026,920 A | 2/2000 | Obeda et al. |
| 6,116,618 A | 9/2000 | Shono et al. |
| 6,142,494 A | 11/2000 | Higuchi |
| 6,149,226 A | 11/2000 | Hoelzel |
| 6,213,561 B1 | 4/2001 | Witthaus |
| 6,250,649 B1 | 6/2001 | Braun |
| 6,311,795 B1 | 11/2001 | Skotnikov |
| 6,328,125 B1 | 12/2001 | Van Den Brink et al. |
| 6,390,505 B1 | 5/2002 | Wilson |
| 6,425,585 B1 | 7/2002 | Schuekle et al. |
| 6,435,522 B1 | 8/2002 | Van Den Brink et al. |
| 6,446,980 B1 | 9/2002 | Kutscher et al. |
| 6,454,035 B1 | 9/2002 | Waskow et al. |
| 6,467,783 B1 | 10/2002 | Blondelet et al. |
| 6,722,676 B2 | 4/2004 | Zadok |
| 6,805,362 B1 | 10/2004 | Melcher |
| 6,817,617 B2 | 11/2004 | Hayashi |
| 7,066,474 B2 | 6/2006 | Hiebert et al. |
| 7,073,806 B2 | 7/2006 | Bagnoli |
| 7,097,187 B2 | 8/2006 | Walters et al. |
| 7,131,650 B2 | 11/2006 | Melcher |
| 7,229,086 B1 | 6/2007 | Rogers |
| 7,389,592 B2 | 6/2008 | Tsuruta et al. |
| 7,487,985 B1 | 2/2009 | Mighell |
| 7,568,541 B2 | 8/2009 | Pfeil et al. |
| 7,591,337 B2 | 9/2009 | Suhre et al. |
| 7,607,695 B2 | 10/2009 | Moulene et al. |
| 7,640,086 B2 | 12/2009 | Nakashima et al. |
| 7,641,207 B2 | 1/2010 | Yang |
| 7,648,148 B1 | 1/2010 | Mercier |
| 7,665,742 B2 | 2/2010 | Haerr et al. |
| 7,673,883 B2 | 3/2010 | Damm |
| 7,887,070 B2 | 2/2011 | Kirchner |
| 7,896,360 B2 | 3/2011 | Buma |
| 7,946,596 B2 | 5/2011 | Hsu et al. |
| 8,050,820 B2 | 11/2011 | Yanaka et al. |
| 8,104,781 B2 | 1/2012 | Gazarek |
| 8,260,504 B2 | 9/2012 | Tsujii et al. |
| 8,262,111 B2 | 9/2012 | Lucas |
| 8,345,096 B2 | 1/2013 | Ishiyama et al. |
| 8,641,064 B2 | 2/2014 | Krajekian |
| 8,818,700 B2 | 8/2014 | Moulene et al. |
| 2001/0028154 A1 | 10/2001 | Sebe |
| 2002/0109310 A1 | 8/2002 | Lim et al. |
| 2002/0171216 A1 | 11/2002 | Deal |
| 2003/0071430 A1 | 4/2003 | Serra et al. |
| 2003/0102176 A1 | 6/2003 | Bautista |
| 2003/0141689 A1 | 7/2003 | Hamy |
| 2003/0197337 A1 | 10/2003 | Dodd et al. |
| 2004/0051262 A1 | 3/2004 | Young |
| 2004/0100059 A1 | 5/2004 | Van Den Brink |
| 2004/0134302 A1 | 7/2004 | Ko et al. |
| 2004/0236486 A1 | 11/2004 | Krause et al. |
| 2005/0051976 A1 | 3/2005 | Blondelet et al. |
| 2005/0082771 A1 | 4/2005 | Oh |
| 2005/0127656 A1 | 6/2005 | Sato et al. |
| 2005/0184476 A1 | 8/2005 | Hamm |
| 2005/0199087 A1 | 9/2005 | Li et al. |
| 2005/0206101 A1 | 9/2005 | Bouton |
| 2005/0275181 A1 | 12/2005 | MacIsaac |
| 2006/0049599 A1 | 3/2006 | Lehane |
| 2006/0091636 A1 | 5/2006 | Shelton |
| 2006/0151982 A1 | 7/2006 | Mills |
| 2006/0170171 A1 | 8/2006 | Pedersen |
| 2006/0220331 A1 | 10/2006 | Schafer et al. |
| 2006/0226611 A1 | 10/2006 | Xiao et al. |
| 2006/0249919 A1 | 11/2006 | Suzuki et al. |
| 2006/0276944 A1 | 12/2006 | Yasui et al. |
| 2007/0075517 A1 | 4/2007 | Suhre et al. |
| 2007/0078581 A1 | 4/2007 | Nenninger et al. |
| 2007/0126199 A1 | 6/2007 | Peng et al. |
| 2007/0151780 A1 | 7/2007 | Tonoli et al. |
| 2007/0182120 A1 | 8/2007 | Tonoli et al. |
| 2007/0193803 A1 | 8/2007 | Geiser |
| 2007/0193815 A1 | 8/2007 | Hobbs |
| 2007/0228675 A1 | 10/2007 | Tonoli et al. |
| 2008/0012262 A1 | 1/2008 | Carabelli et al. |
| 2008/0033612 A1 | 2/2008 | Raab |
| 2008/0100018 A1 | 5/2008 | Dieziger |
| 2008/0114509 A1 | 5/2008 | Inoue et al. |
| 2008/0135320 A1 | 6/2008 | Matthies |
| 2008/0164085 A1* | 7/2008 | Cecinini ................... 180/210 |
| 2008/0197597 A1 | 8/2008 | Moulene et al. |
| 2008/0197599 A1 | 8/2008 | Comstock et al. |
| 2008/0238005 A1* | 10/2008 | James ..................... 280/5.509 |
| 2008/0255726 A1 | 10/2008 | Fischlein et al. |
| 2008/0258416 A1 | 10/2008 | Wilcox |
| 2008/0272562 A1 | 11/2008 | Sabelstrom et al. |
| 2009/0085311 A1 | 4/2009 | Kim et al. |
| 2009/0105906 A1 | 4/2009 | Hackney et al. |
| 2009/0108555 A1 | 4/2009 | Wilcox |
| 2009/0171530 A1 | 7/2009 | Bousfield |
| 2009/0289437 A1 | 11/2009 | Steinhilber |
| 2009/0299565 A1 | 12/2009 | Hara et al. |
| 2009/0312908 A1 | 12/2009 | Van Den Brink |
| 2009/0314566 A1 | 12/2009 | Rust |
| 2010/0025944 A1 | 2/2010 | Hara et al. |
| 2010/0032914 A1 | 2/2010 | Hara et al. |
| 2010/0032915 A1 | 2/2010 | Hsu et al. |
| 2010/0044977 A1 | 2/2010 | Hughes et al. |
| 2010/0044979 A1 | 2/2010 | Haeusler et al. |
| 2010/0152987 A1 | 6/2010 | Gorai |
| 2011/0006498 A1 | 1/2011 | Mercier |
| 2011/0095494 A1 | 4/2011 | White |
| 2011/0148052 A1 | 6/2011 | Quemere |
| 2011/0215544 A1 | 9/2011 | Rhodig |
| 2011/0254238 A1 | 10/2011 | Kanou |
| 2012/0098225 A1 | 4/2012 | Lucas |
| 2012/0248717 A1 | 10/2012 | Tsujii et al. |
| 2013/0153311 A1* | 6/2013 | Huntzinger ................. 180/55 |
| 2013/0168934 A1 | 7/2013 | Krajekian |
| 2014/0252731 A1* | 9/2014 | Spahl et al. ................ 280/5.5 |
| 2014/0252732 A1* | 9/2014 | Spahl et al. ................ 280/5.5 |
| 2014/0252733 A1* | 9/2014 | Spahl et al. ................ 280/5.5 |
| 2014/0252734 A1 | 9/2014 | Spahl et al. |

FOREIGN PATENT DOCUMENTS

| | | |
|---|---|---|
| DE | 6801096 U | 11/1967 |
| DE | 40 35 128 A1 | 6/1992 |
| DE | 41 35 585 A1 | 5/1993 |
| DE | 42 36 328 C1 | 9/1993 |
| DE | 43 15 017 C1 | 9/1994 |
| DE | 196 21 947 C1 | 10/1997 |
| DE | 197 35 912 A1 | 3/1998 |
| DE | 198 48 294 A1 | 10/1999 |
| DE | 198 38 328 C1 | 12/1999 |
| DE | 198 31 162 A1 | 7/2000 |
| DE | 102 51 946 B3 | 3/2004 |
| DE | 103 49 655 A1 | 6/2005 |
| DE | 10 2004 027 202 A1 | 10/2005 |
| DE | 10 2004 058 523 A1 | 6/2006 |
| DE | 11 2006 002 581 T5 | 9/2008 |

(56) References Cited

FOREIGN PATENT DOCUMENTS

| | | |
|---|---|---|
| DE | 102007024769 A1 | 11/2008 |
| DE | 10 2008 046 588 A1 | 3/2010 |
| DE | 10 2009 042 662 A1 | 3/2011 |
| DE | 10 2010 000 884 A1 | 7/2011 |
| DE | 10 2010 000 886 A1 | 7/2011 |
| DE | 10 2010 055 947 A1 | 8/2011 |
| DE | 102010041404 A1 | 3/2012 |
| EP | 0 592 377 A1 | 4/1994 |
| EP | 0 626 307 A1 | 11/1994 |
| EP | 0 658 453 B1 | 6/1995 |
| EP | 1 030 790 B1 | 8/2000 |
| EP | 1 142 779 A2 | 10/2001 |
| EP | 1 153 773 A2 | 11/2001 |
| EP | 1 155 950 A2 | 11/2001 |
| EP | 1 180 476 B1 | 2/2002 |
| EP | 1 228 905 A2 | 8/2002 |
| EP | 1 346 907 A2 | 9/2003 |
| EP | 1 348 617 B1 | 10/2003 |
| EP | 1 419 909 B1 | 5/2004 |
| EP | 1 539 563 B1 | 6/2005 |
| EP | 1 630 081 A1 | 3/2006 |
| EP | 1 702 773 A2 | 9/2006 |
| EP | 1 872 981 A1 | 1/2008 |
| EP | 1 944 228 A1 | 7/2008 |
| EP | 2 030 814 A2 | 3/2009 |
| EP | 2077223 A1 | 7/2009 |
| EP | 2 199 122 A1 | 6/2010 |
| EP | 2 213 561 A1 | 8/2010 |
| FR | 2 663 283 A1 | 12/1991 |
| FR | 2 768 203 A1 | 3/1999 |
| FR | 2 872 699 A1 | 1/2006 |
| FR | 2 927 026 A1 | 8/2009 |
| FR | 2 937 000 A1 | 4/2010 |
| FR | 2 946 944 A1 | 12/2010 |
| GB | 2 322 837 A | 9/1998 |
| GB | 2 382 334 A | 11/2001 |
| GB | 2 374 327 A | 10/2002 |
| GB | 2 390 065 A | 12/2003 |
| GB | 2 394 701 A | 5/2004 |
| GB | 2 444 250 A | 6/2008 |
| GB | 2 450 740 A | 1/2009 |
| GB | 2 472 180 A | 2/2011 |
| GB | 2 492 757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | WO-2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011/023862 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011/107674 A1 | 9/2011 |

OTHER PUBLICATIONS

German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Office Action dated Dec. 19, 2014 for U.S. Appl. No. 14/201,586.
Office Action dated Oct. 10, 2014 for U.S. Appl. No. 14/201,602.
Office Action dated Sep. 4, 2014 for U.S. Appl. No. 14/201,628.
Office Action dated Dec. 26, 2014 of U.S. Appl. No. 14/201,628.
Office Action dated Mar. 11, 2015 for U.S. Appl. No. 14/201,628.
Office Action dated Jan. 29, 2015 for U.S. Appl. No. 14/201,616.

* cited by examiner

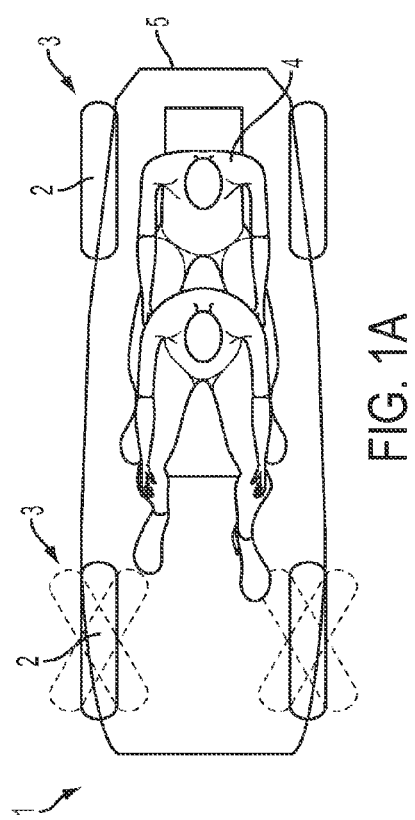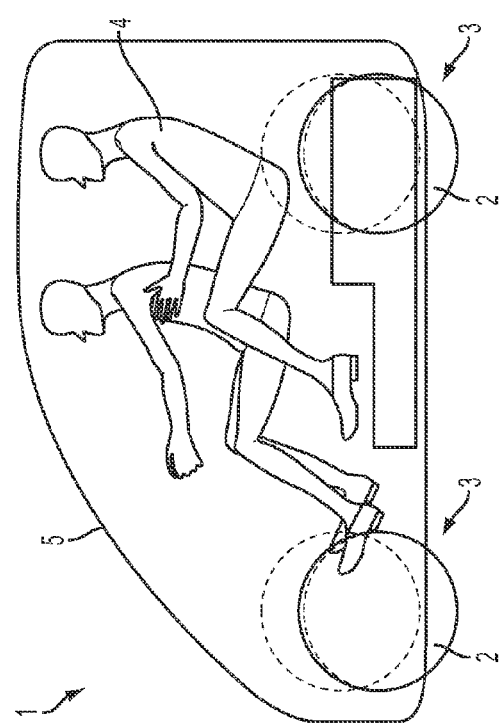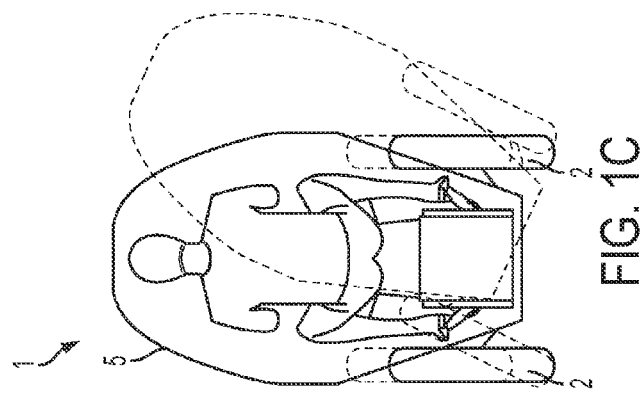

LATERALLY TILTABLE, MULTITRACK VEHICLE

CROSS REFERENCE TO RELATED APPLICATIONS

This application claims priority to German Application No. 102013203923.9, filed on Mar. 7, 2013, the entire content of which is incorporated by reference herein. This application also is related to German Application No. 102013203922.0, filed Mar. 7, 2013; German Application No. 102013203927.1, filed Mar. 7, 2013; German Application No. 102013203926.3, filed Mar. 7, 2013; and German Application No. 102013203924.7, filed Mar. 7, 2013, the entire content of each of which is incorporated by reference herein.

TECHNICAL FIELD

The present disclosure relates generally to a laterally tillable multitrack vehicle, such as a motor vehicle, and more particularly to a laterally tiltable multitrack vehicle having the ability to self-upright after tilting.

BACKGROUND

In recent years, interest in vehicles with innovative designs has grown in view of continued expansion of urban areas, the large number of vehicles operating in these areas, and the associated problems, such as traffic jams or environmental pollution. One way to solve parking problems and/or to improve the traffic flow is to design vehicles in a manner that permits a plurality of vehicles to share a parking space or a driving lane. In order for such a solution to be feasible, vehicles must be small and, in particular, narrow. A vehicle of this type is usually sized to convey no more than one to two persons. The small size and the low weight of such vehicles make it possible to reduce the engine power output and also the emissions caused by the vehicle without any loss of driving performance.

Many attempts have been made in recent years to develop multitrack, laterally tiltable vehicles, in which the entire vehicle or a part thereof tilts in toward a rotation center (e.g., the curve bend inner side) in a similar manner to a bicycle when driving around curves. With such tilting, the resultant of the weight force and the centrifugal force runs substantially along the vertical axis of the vehicle body, preventing the vehicle from turning over. Accordingly, lateral tipping of the vehicle toward the bend outer side can be prevented, even in the case of a relatively narrow track width of the laterally tiltable vehicle (as compared with conventional, multitrack vehicles).

Different types of laterally tiltable vehicles having three or four wheels have been disclosed in practice. For example, in some three-wheeled vehicles, merely the vehicle body and the central wheel can be tilted, whereas the wheel pair has two eccentric wheels which are arranged on a common axle and cannot be tilted. In general, however, a solution is preferred, in which all the wheels can tilt together with the vehicle body, since this solution requires less installation space in relation to the width of the vehicle and the vehicle is therefore of narrower overall design.

One important aspect in laterally tiltable vehicles is ability to right itself (self-uprighting) after tilting. Normally, the centroid of the vehicle drops during lateral tilting of the vehicle body. This means, however, that the vehicle body of the laterally tilted, multitrack vehicle will not upright itself again automatically. An elegant possibility for achieving automatic uprighting of the laterally tilted vehicle body is to raise the centroid of the vehicle during lateral tilting as the tilting angle increases. In addition, this solution affords the essential advantage that the vehicle automatically assumes a stable, upright position even at a standstill, since the centroid of the vehicle is at the lowest in this position. Accordingly, the present disclosure is directed to providing an automatic self-uprighting multitrack, laterally bitable vehicle. The present disclosure is further directed to providing such a vehicle having a compact overall design, in order to keep the required installation space as small as possible in order to realize a narrow vehicle.

SUMMARY

In accordance with various exemplary embodiments, the present disclosure provides a laterally tiltable, multitrack vehicle. The vehicle comprises a vehicle body and at least three wheels. First and second wheels of the three wheels are assigned to a common axle to form a first wheel pair. A first wheel control part suspends the first wheel of the wheel pair from the vehicle body and a second wheel control part suspends the second wheel of the wheel pair from the vehicle body. The first wheel control part is configured to be coupled to the second wheel control part via a first gearwheel mechanism, and the second wheel control part is configured to be coupled to the first wheel control part via a second gearwheel mechanism. The first and second gearwheel mechanisms each have a negative transmission ratio between a drive shaft and an output shaft.

In accordance with one aspect of the present disclosure, the laterally tiltable, multitrack vehicle is a motor vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 1A shows a plan view of a first exemplary embodiment of a multitrack, laterally tiltable vehicle in accordance with the present disclosure;

FIG. 1B shows a side view of the first exemplary embodiment of a multitrack, laterally tiltable vehicle of FIG. 1A in accordance with the present disclosure;

FIG. 1C shows a rear view of the first exemplary embodiment of a multitrack, laterally tiltable vehicle of FIG. 1A in accordance with the present disclosure.

Figure 2C:
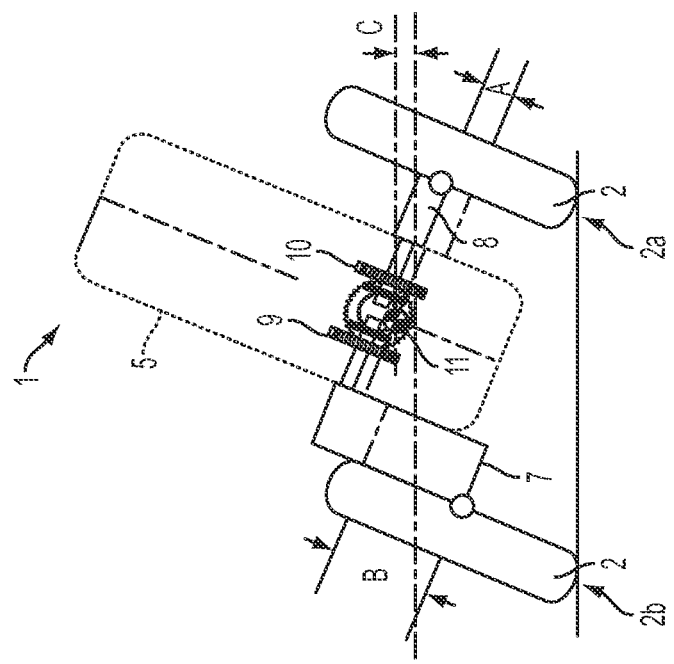
FIG. 2C is a rear view of the multitrack, laterally tiltable vehicle of FIGS. 1A-1C in a first tilted position.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a laterally tiltable, multitrack motor vehicle is provided. The vehicle has at least three wheels, a vehicle body, for example a vehicle frame, and at least one wheel pair. The wheel pair includes two wheels which are assigned to a common axle. Each of the wheels of the wheel pair is suspended on the vehicle body via a respective wheel control part. The wheel control parts may include, for example, a wheel control link such as a longitudinal link or wishbone. In accordance with the present disclosure, a first wheel control part can be coupled to a second wheel control part via a first gearwheel mechanism, for example a planetary gear mechanism or a differential gear mechanism. The second wheel control part can likewise be coupled to the first wheel control part via a second gearwheel mechanism, for example a planetary gear mechanism or a differential gear mechanism. As soon as coupling of the first wheel control part to the second control part is produced via one of the two gearwheel mechanisms, a movement of one wheel control part is transmitted to the other wheel control part in accordance with a transmission ratio of the gearwheel mechanism which is used for coupling. As disclosed herein, each gearwheel mechanism has a negative transmission ratio between a drive shaft and an output shaft.

As a general, non-limiting example, the drive shaft of the first gearwheel mechanism is assigned to the first wheel control part and the drive shaft of the second gearwheel mechanism is assigned to the second wheel control part in the following description. Therefore, the output shaft of the first gearwheel mechanism is assigned to the second wheel control part and the output shaft of the second gearwheel mechanism is assigned to the first wheel control part. In this context, assignment means that, in the case of a coupling having been produced between the first wheel control part and the second wheel control part by means of the first gearwheel mechanism, the drive shaft of the first gearwheel mechanism is connected to the first wheel control part and the output shaft of the first gearwheel mechanism is connected to the second wheel control part. Correspondingly, in the case of a coupling having been produced of both wheel control parts via the second gearwheel mechanism, the drive shaft of the second gearwheel mechanism is connected to the second wheel control link and the output shaft of the second gearwheel mechanism is connected to the first wheel control link.

As is understood by those of skill in the art, the ratio of the rotational speed of the drive shaft to the rotational speed of the output shaft of each gearwheel mechanism is defined as the transmission ratio. A negative transmission ratio specifies that the drive and output shafts of the respective gearwheel mechanisms rotate in opposite directions.

For example, when a laterally tiltable multitrack vehicle in accordance with the present teachings drives through a first curve (bend), the wheel control part assigned to the outer wheel in the bend (e.g., the wheel closest to the outer curve of the bend), for example the first wheel control part, is coupled via the first gearwheel mechanism to the second wheel control part, which is assigned to the inner wheel in the bend (e.g., the wheel closest to the inner curve of the bend). In this case, the second gearwheel mechanism does not produce any coupling between the wheel control parts. The disconnection of the coupling of the second gearwheel mechanism between the wheel control parts can be controlled, for example, by clutch means as will be understood by those of skill in the art. If both the vehicle body and the wheels then tilt toward the inner side of the bend, the outer wheel in the bend and, as a consequence, also the first wheel control part move away from the vehicle body (downward as viewed from the vehicle body (see, e.g., FIG. 2C)). Since the transmission ratio of the gearwheel mechanism is negative in accordance with the present teachings, the inner wheel in the bend and, as a consequence, the second wheel control part move in the opposite direction to the first wheel control part, that is to say toward the vehicle body (upward as viewed from the vehicle body (see, e.g., FIG. 2C)).

When the first curve (bend) ends, the vehicle body and the wheels no longer need to tilt and the vehicle uprights. The coupling of the first wheel contact part via the first gearwheel mechanism to the second wheel control parts stays active until the vehicle has reached an upright position. A change in coupling only happens once a tilt in an opposite direction happens as described below.

When the same vehicle then drives through a second bend, curving in a direction opposite to the first bend, the vehicle body and the wheels of the vehicle again tilt toward the inner side of the bend and, therefore, in the opposite direction to the above-described case. The outer, second wheel control part associated with the outer wheel in the bend is then coupled to the first, inner wheel control part associated with the inner wheel in the bend via the second gearwheel mechanism. In this case, the first gearwheel mechanism does not produce any coupling between the wheel control parts. The disconnection of the coupling of the first gearwheel mechanism between the wheel control parts can once again take place via clutch means in a manner that will be understood by those of skill in the art. If the vehicle body and the wheels then tilt toward the inner side of the bend, the outer wheel in the bend and, as a consequence, also the second wheel control part move away from the vehicle body (downward as viewed from the vehicle body (see, e.g., FIG. 2D)). Since the transmission ratio of the gearwheel mechanism is negative in accordance with the present teachings, the inner wheel in the bend and, as a consequence, the first wheel control part move in the opposite direction to the second wheel control part, that is to say toward the vehicle body (upward as viewed from the vehicle body (see, e.g., FIG. 2O)).

In accordance with the present disclosure, the transmission ratio of the gearwheel mechanisms is less than −1. The negative transmission ratio of less than −1 ensures that, during the lateral tilting of the vehicle, the first wheel control part, associated with the inner wheel in the bend, moves upward by an amount that is less than an amount that the second wheel control part, associated with the outer wheel in the bend, moves downward. This leads to the vehicle body, which is inclined laterally toward the inner side of the bend, and the centroid of the vehicle being raised relative to a position of the centroid when the vehicle body is in an upright, neutral position. As a result, automatic self-uprighting of the vehicle body into the upright, neutral position is possible, since the centroid of the vehicle has its lowest location in the upright, neutral position.

The use of two gearwheel mechanisms for coupling the two wheel control parts to raise the centroid of the vehicle body during lateral tilting thereof as described herein requires minimal installation space and is centrally located on the vehicle. The solution for the automatic self-uprighting of the laterally tiltable, multitrack vehicle can therefore be realized in a particularly compact manner.

In accordance with one aspect of the present disclosure, the gearwheel mechanisms are planetary gear mechanisms or differential gear mechanisms (of compact overall design).

In accordance with another aspect of the present teachings, and in order to provide satisfactory driving comfort of the vehicle, each wheel, which is assigned to a wheel control part, is mounted on the respective wheel control part in a manner which is resilient and damped in terms of oscillations. Thus, oscillations of the respective wheel due to, for example, an uneven surface, are absorbed directly at the wheel itself and are not substantially transmitted to the gearwheel mechanisms, at least not in an undamped manner.

In accordance with the present disclosure, the wheel control parts are longitudinal links. A first end of each of the longitudinal links is pivotably mounted on the vehicle body and a second end of each link is rotatably mounted to a respective wheel. Accordingly, each wheel of the wheel pair is suspended independently on the vehicle body via one longitudinal link. In the multitrack, laterally tiltable motor vehicle having driven rear wheels, a longitudinal link suspension system affords the advantage that the rear wheels can be driven via a chain or belt drive.

In one exemplary embodiment, the multitrack, laterally tiltable vehicle includes two wheel pairs. The first wheel pair of the vehicle forms steerable front wheels and the second wheel pair forms the rear wheels of the vehicle.

FIGS. 1A-1C show a plan view, a side view, and a rear view of a first exemplary embodiment of a multitrack, laterally tiltable motor vehicle 1. In accordance with the present teachings, the vehicle 1 has a total of four wheels 2, two wheels 2 which are assigned to a common axle to form a wheel pair 3. As can be seen in FIGS. 1A-1C, the vehicle 1 has a front wheel pair 3, in which the wheels 2 are steerable and a rear, non-steerable wheel pair 3. The vehicle 1 is designed for transporting from one to two persons or occupants 4, the two vehicle occupants 4 sitting one behind the other in the vehicle 1, as shown in FIGS. 1A-1C. As shown in FIGS. 1A-1C, the vehicle 1 has a dosed vehicle body 5 which protects the occupants 4, for example, against external weather influences and additionally provides the occupants 4 with improved safety in comparison with an open vehicle body.

As shown in the rear view of FIG. 1C, both the vehicle body 5 and the wheels 2 tilt during the lateral tilting of the vehicle 1. The laterally tilted vehicle 1 is illustrated in the rear view by a dashed line in FIG. 1C.

The drive of the vehicle 1 may be, for example, an electric motor or a combustion engine, or a combination of an electric motor and a combustion engine (a hybrid drive).

Figure 2B:
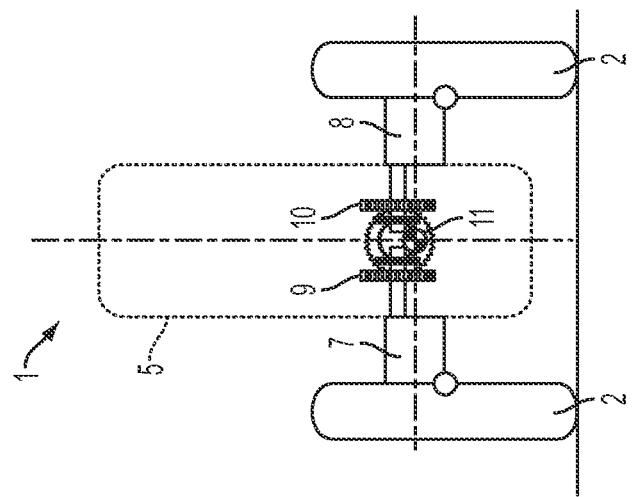
FIG. 2B is a rear view of the multitrack, laterally tiltable vehicle of FIGS. 1A-1C in an upright position.
Figure 2A:
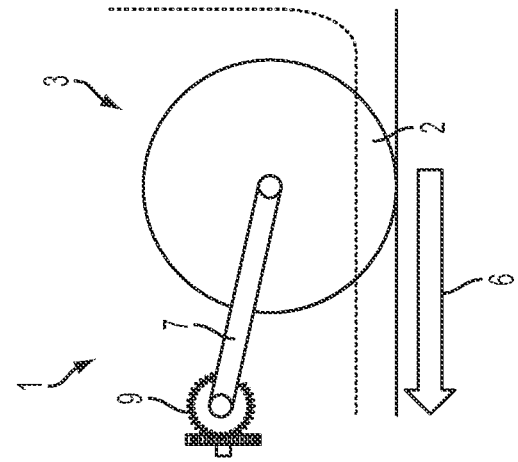
FIG. 2A is a side view of a connection structure used to connect and support a wheel pair of the multitrack, laterally tiltable vehicle of FIGS. 1A-1C.
Figure 2D:
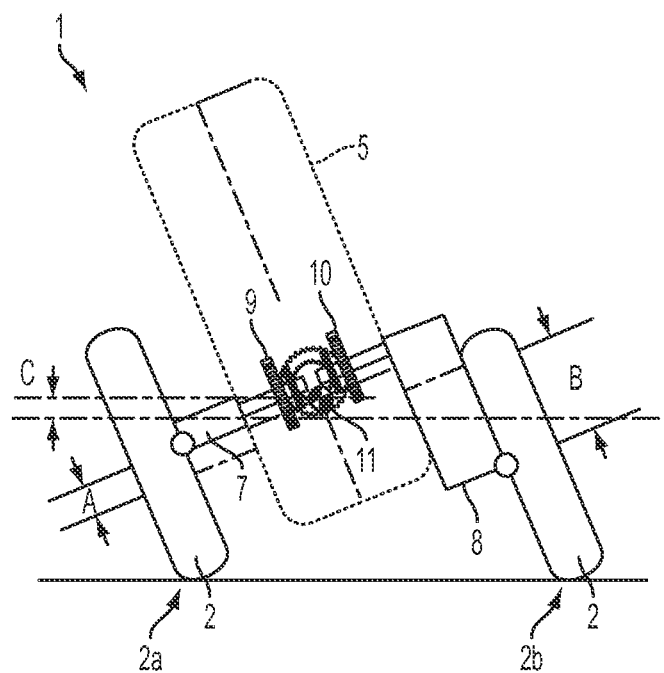
FIG. 2D is a rear view of the multitrack, laterally tiltable vehicle of FIGS. 1A-1C in a second tilted position, opposite to the tilted position shown in FIG. 2C.

FIGS. 2A-2D show a side view, a first rear view, a second tilted rear view, and a third tilted rear view of the vehicle 1 which is shown in FIGS. 1A-1C. In FIG. 2A, the forward driving direction of the vehicle 1 is indicated by a corresponding arrow 6. FIG. 2B shows the vehicle 1, as viewed from behind, in a non-inclined, upright position. FIG. 2C shows the vehicle 1 in a position which is tilted laterally to the right in the drawing. FIG. 2D shows the vehicle 1 in a position which is tilted laterally to the left in the drawing. Each of FIGS. 2A-2D show the wheels 2 of the rear wheel pair 3 of the vehicle 1 which is shown in FIGS. 1A-1C.

As shown in FIGS. 2B-2D, one wheel 2 of the wheel pair 3 is suspended on the vehicle body 5 by means of a first wheel control part 7. First wheel control part 7 may be formed, for example, by a first longitudinal link 7. The other wheel 2 of the wheel pair 3 is suspended on the vehicle body 5 by means of a second wheel control part 8, formed, for example, by a second longitudinal link 8. Each longitudinal link 7, 8 is pivotably mounted at one end on the vehicle body 5 and at the other end is rotatably mounted to the respective wheel 2.

FIGS. 2B-2D show two gearwheel mechanisms 9, 10 in the region of the pivotable mounting of the two wheel control parts 7, 8 (longitudinal links 7, 8). Coupling between the first longitudinal link 7 and the second longitudinal link 8 can be produced via the first gearwheel mechanism 9 with a negative transmission ratio of less than −1 provided between its drive shaft, which is connected to the first longitudinal link 7, and its output shaft, which is connected to the second longitudinal link 8. Furthermore, coupling between the second longitudinal link 8 and the first longitudinal link 7 can be produced via the second gearwheel mechanism 10 with a negative transmission ratio of less than −1 between its drive shaft, which is connected to the second longitudinal link 8, and its output shaft, which is connected to the first longitudinal link 7.

FIG. 2C illustrates the vehicle body 5 and the wheels 2 of the wheel pair 3 tilting to the right as the vehicle 1 drives around a right-hand bend (curve), for example. In this case, the first, outer longitudinal link 7 is coupled, via the first gearwheel mechanism 9, to the second, inner longitudinal link 8 when the vehicle enters the curve. In this example, the second gearwheel mechanism 10 does not produce any coupling between the longitudinal links 7 and 8. The disconnection of the coupling between the wheel control parts 7 and 8 by means of the second gearwheel mechanism 10 can take place via clutch means, schematically depicted with numeral 22 in the exemplary embodiment of FIG. 3, as will be understood by those of skill in the art. As FIG. 2C shows, the outer wheel 2 in the bend and the respective outer, first longitudinal link 7 in the bend move downward away from the vehicle body 5. Since the transmission ratio of the gearwheel mechanism 9 is negative, the inner wheel 2a in the bend and, as a consequence, the second longitudinal link 8 move in the opposite direction to the first longitudinal link 7, that is to say upward toward the vehicle body 5. The negative transmission ratio of the gearwheel mechanism 9 of less than −1 then ensures that the inner, second longitudinal link 8 in the bend moves upward by an amount A which is smaller than an amount B by which the outer, first longitudinal link 7 in the bend moves downward. This causes the vehicle body 5, which is tilted laterally toward the inner side of the bend, and the centroid 11 of the vehicle 1 to be raised. This feature is illustrated in FIGS. 2B and 2C, in which vehicle body 5 and centroid 11 are raised by the same amount C, as shown by two dash-dotted lines which run horizontally through the centroid 11 in these figures. Raising the centroid 11 during the lateral tilting of the vehicle 1 makes automatic self-uprighting of the vehicle body 5 into the upright, neutral position possible, since the centroid 11 of the vehicle 1 is in its lowest location when the vehicle body 5 is in the upright, neutral position.

FIG. 2D illustrates the vehicle of FIGS, 2A-2C when in a left-hand bend. As can be seen from the figures, FIG. 2D is essentially a mirror image of FIG. 2C. FIG. 2D illustrates the vehicle body 5 and the wheels 2 of the wheel pair 3 tilting to the left as the vehicle 1 drives around a left-hand bend (curve), for example. In this case, outer longitudinal link 8 is coupled, via the gearwheel mechanism 10, to the inner longitudinal link 7 when the vehicle enters the curve. In this example, the gearwheel mechanism 9 does not produce any coupling between the longitudinal links 7 and 8. The disconnection of the coupling between the wheel control parts 7 and 8 by means of the gearwheel mechanism 9 can take place via clutch means as will be understood by those of skill in the art. As FIG. 2D shows, the outer wheel 2b in the bend and the respective outer, longitudinal link 8 in the bend move downward away from the vehicle body 5. Since the transmission ratio of the gearwheel mechanism 10 is negative, the inner wheel 2a in the bend and, as a consequence, the longitudinal link 7 move in the opposite direction to the first longitudinal link 8, that is to say upward toward the vehicle body 5. The negative transmission ratio of the gearwheel mechanism 10 of less than −1 then ensures that the inner, longitudinal link 7 in the bend moves upward by an amount A which is smaller than an amount B by which the outer, longitudinal link 8 in the bend moves downward. This causes the vehicle body 5, which is tilted laterally toward the inner side of the bend, and the centroid 11 of the vehicle 1 to be raised. This feature is illustrated in FIGS. 2B and 20, in which vehicle body 5 and centroid 11 are raised by the same amount C, as shown by two dash-dotted lines which run horizontally through the centroid 11 in these figures. Raising the centroid 11 during the lateral tilting of the vehicle 1 makes automatic self-uprighting of the vehicle body 5 into the upright, neutral position possible, since the centroid 11 of the vehicle 1 is in its lowest location when the vehicle body 5 is in the upright, neutral position.

Figure 3:
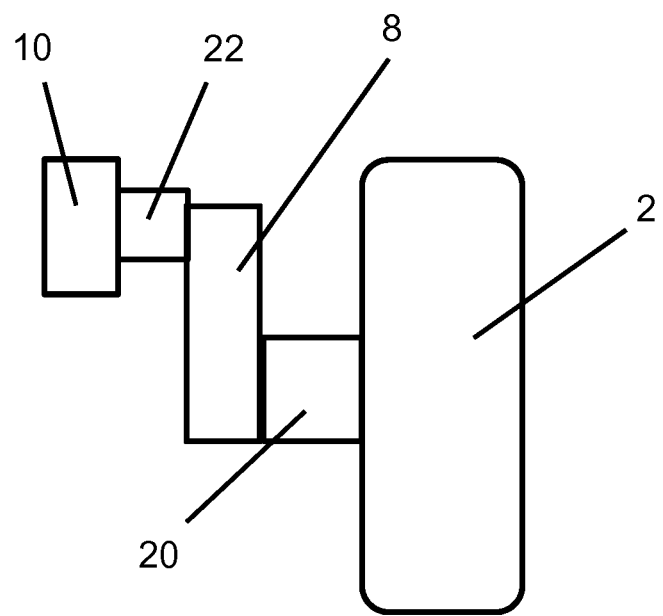
FIG. 3 schematically depicts a mount between a wheel and a wheel control part and connection between the wheel control part and a gearwheel mechanism, according to an exemplary embodiment.

In accordance with an aspect of the present teachings, and in order to provide satisfactory driving comfort of the vehicle, each wheel, which is assigned to a wheel control part, is mounted on the respective wheel control part in a manner which is resilient and damped in terms of oscillations. For example, FIG. 3 schematically depicts mounting wheel 2 to wheel control part 8 via a resilient damping device 20. Other wheels of various exemplary embodiments described herein may be mounted in a similar manner. Thus, oscillations of a respective wheel due to, for example, an uneven surface, are absorbed directly at the wheel itself and are not substantially transmitted to the gearwheel mechanisms, at least not in an undamped manner.

A laterally tiltable, multitrack vehicle as described above and in accordance with the present teachings is not restricted to the exemplary embodiment(s) disclosed herein, but rather also encompasses other embodiments which have an identical effect. For example, a laterally tiltable, multitrack vehicle in accordance with the present teachings need not be a motor vehicle and instead may be a vehicle powered by other means, including being powered by the occupants of the vehicle themselves (e.g., muscle power). That is to say, although the present teachings are described with respect to a motor vehicle, other vehicles are encompassed within the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A laterally tiltable, multitrack vehicle, comprising:
   a vehicle body;
   three wheels;
   first and second wheels of the three wheels assigned to a common axle to form a first wheel pair; and
   a first wheel control part suspending the first wheel of the wheel pair from the vehicle body and a second wheel control part suspending the second wheel of the wheel pair from the vehicle body;
   wherein the first wheel control part is configured to be coupled to the second wheel control part via a first gearwheel mechanism, and wherein the second wheel control part is configured to be coupled to the first wheel control part via a second gearwheel mechanism, each of the first and second gearwheel mechanisms having a negative transmission ratio between a drive shaft and an output shaft, wherein the transmission ratio is configured to provide a first amount of movement in the first wheel control part and a second amount of movement, different from the first amount, in the second wheel control part, in response to lateral tilting of the vehicle.

2. The vehicle as claimed in claim 1, wherein the transmission ratio is less than −1.

3. The vehicle as claimed in claim 1, wherein the first and second gearwheel mechanisms are planetary gear mechanisms or differential gear mechanisms.

4. The vehicle as claimed in claim 1, wherein each wheel of the wheel pair is mounted on a respective one of the first and second wheel control parts in a manner which is resilient and damped in terms of oscillations.

5. The vehicle as claimed in claim 1, wherein the first and second wheel control parts are longitudinal links.

6. The vehicle as claimed in claim 5, wherein a first end of each longitudinal link is pivotably mounted on the vehicle body and a second end of each longitudinal link is rotatably mounted on a respective wheel of the wheel pair.

7. The vehicle as claimed in claim 1, further comprising a fourth wheel, the third and fourth wheels forming a second wheel pair.

8. The vehicle of claim 7, wherein one wheel pair forms steerable front wheels and the second wheel pair forms rear wheels of the vehicle.

9. The vehicle of claim 1, wherein the vehicle is a motor vehicle.

10. The vehicle of claim 1, further comprising at least one clutch device to control coupling between the gearwheel mechanisms and the wheel control parts.

11. A laterally tiltable, multitrack vehicle, comprising:
first and second wheels assigned to a common axle;
a third wheel; and
first and second wheel control parts suspending, respectively, the first and second wheels from a vehicle body;
a first gearwheel mechanism configured to couple the first wheel control part to the second wheel control part; and
a second gearwheel mechanism configured to couple the second wheel control part to the first wheel control part, each of the first and second gearwheel mechanisms having a negative transmission ratio between a drive shaft and an output shaft;
wherein each of the transmission ratios is configured to raise a center of gravity of the vehicle body upon lateral tilting of the vehicle, relative to the center of gravity of the vehicle body when the vehicle is upright.

12. The vehicle as claimed in claim 11, wherein the transmission ratios are further configured to move the first and second wheel control parts different amounts during lateral tilting, thus raising a center of gravity of the vehicle body during tilting.

13. The vehicle as claimed in claim 12, wherein the amount each of the first and second wheel control parts are moved during lateral tilting depends on whether the first and second wheel control parts are located on an inner side or an outer side of a bend the vehicle is traveling through.

14. The vehicle as claimed in claim 11, wherein each of the first and second gearwheel mechanisms is a planetary gear mechanism.

15. A laterally tiltable, multitrack vehicle, comprising:
first and second wheels assigned to a common axle;
a third wheel;
first and second wheel control parts suspending, respectively, the first and second wheels from a vehicle body; and
a first gearwheel mechanism and second gearwheel mechanism configured to couple the first and second wheel control parts;
wherein each of the first and second gearwheel mechanisms is a planetary gear mechanism.

16. A laterally tiltable, multitrack vehicle, comprising:
first and second wheels assigned to a common axle;
a third wheel; and
first and second wheel control parts suspending, respectively, the first and second wheels from a vehicle body;
a first gearwheel mechanism configured to couple the first wheel control part to the second wheel control part; and
a second gearwheel mechanism configured to couple the second wheel control part to the first wheel control part;
wherein the first and second gearwheel mechanisms are configured to control movement of the first wheel control part, wherein selection of the first or second gearwheel mechanism to control movement is based, at least in part, on a direction of tilt of the vehicle.

17. The vehicle as claimed in claim 16, wherein the first wheel control part travels a first amount when located on an inner side of a bend the vehicle is traveling through and the second gearwheel mechanism is selected to control the first wheel control part, and wherein the first wheel control part travels a second amount when located on an outer side of a bend the vehicle is travel through and the first gearwheel mechanism is selected to control the first wheel control part, wherein the first amount is smaller than the second amount.

18. The vehicle as claimed in claim 16, wherein the first and second gearwheel mechanisms are further configured to control movement of the second wheel control part, wherein selection of the first or second gearwheel mechanism to control movement is based, at least in part, on a direction of tilt of the vehicle.

19. The vehicle as claimed in claim 18, wherein each of the first and second gearwheel mechanisms is a planetary gear mechanism.

20. A laterally tiltable, multitrack vehicle, comprising:
first and second wheels assigned to a common axle;
a third wheel; and
first and second wheel control parts suspending, respectively, the first and second wheels from a vehicle body;
a first gearwheel mechanism configured to couple the first wheel control part to the second wheel control part; and
a second gearwheel mechanism configured to couple the second wheel control part to the first wheel control part, each of the first and second gearwheel mechanisms having a negative transmission ratio between a drive shaft and an output shaft, the transmission ratio being less than −1.

21. The vehicle as claimed in claim 20, wherein each of the first and second gearwheel mechanisms is a planetary gear mechanism.

* * * * *